US005135573A

United States Patent [19]

van den Berg et al.

[11] Patent Number: 5,135,573

[45] Date of Patent: Aug. 4, 1992

[54] REMOVAL OF METAL SOAPS FROM HYDROGENATED FATTY PRODUCTS

[75] Inventors: Hendrikus J. van den Berg, Doetinchem, Netherlands; Adelheid M. Deryck, Goch; Pieter M. van Dijk, Schoonhoven, both of Fed. Rep. of Germany; Cornelis M. Lok, BL Didam; Johannes C. Oudejans, AS Zevenaar, both of Netherlands

[73] Assignee: Unilever Patent Holdings B.V., Netherlands

[21] Appl. No.: 617,038

[22] Filed: Nov. 23, 1990

[30] Foreign Application Priority Data

Nov. 23, 1989 [EP] European Pat. Off. ........ 89202989.3
Apr. 6, 1990 [EP] European Pat. Off. ........ 90200832.5

[51] Int. Cl.[5] .............................................. C09F 5/10

[52] U.S. Cl. ...................................... 75/739; 554/74; 554/176

[58] Field of Search .................. 75/739; 260/409, 420

[56] References Cited

U.S. PATENT DOCUMENTS

| | | | |
|---|---|---|---|
| 1,390,688 | 9/1921 | Ellis . | |
| 2,311,633 | 2/1943 | Blaso | 260/420 |
| 2,650,931 | 9/1953 | Dron et al. | 260/409 |
| 4,049,520 | 9/1977 | Wagner | 204/186 |

FOREIGN PATENT DOCUMENTS 2724867 12/1978 Fed. Rep. of Germany .

*Primary Examiner*—Peter D. Rosenberg
*Attorney, Agent, or Firm*—Cushman, Darby & Cushman

[57] ABSTRACT

The invention provides a process for removing fatty acid metal soaps derived from metals with an atomic number from 27 to 29 from hydrogenated fatty products comprising separating solid metal precipitated under the influence of hydrogen at a pressure ranging between 0.05 and 10 MPa from the hydrogenated fatty products. Preferably the hydrogen pressure is between 0.2 and 5 MPa. Preferably the metal is nickel. It is recommended to effect the separation by filtration, using a filter comprising vertical pressure leaves. Also it is possible to treat the hydrogenated fatty product with hydrogen under a pressure between 0.05 and 10 MPa before separating the metal from the fatty product.

10 Claims, No Drawings

REMOVAL OF METAL SOAPS FROM HYDROGENATED FATTY PRODUCTS

This invention relates to a process for the removal of metal fatty acid soaps from hydrogenated fatty products.

Fatty products, such as fatty acids can be obtained from animal and/or vegetable oils and fats for instance by splitting into glycerol and fatty acids and the latter products are hydrogenated on an industrial scale at temperatures from 170° to 235° C. and hydrogen pressures between 1 and 3 MPa using a small percentage of a catalyst based on a metal with an atomic number from 27 to 29 (cobalt, nickel and copper). Apart from the hydrogenation reaction converting unsaturated fatty acids into more saturated fatty acids there also occurs a side reaction between fatty acid and metal in the catalyst resulting in the formation of metal fatty acid soap, which is soluble in the fatty acid product. This reaction may already commence during the heating up period of the catalyst/fatty acid slurry prior to actual hydrogenation. When the hydrogenation has been completed hydrogen supply is stopped, the pressure released and normally hydrogen is replaced by nitrogen, after which the hydrogenated fatty acids are drained into an intermediate vessel prior to separation of the catalyst from the fatty acid (Cf The basics of industrial oleochemistry, G. Dieckelmann. H. J. Heinz 1988 pp. 76, 77). The side reaction mentioned above can proceed further also when the hydrogen pressure has been released as long as the hydrogenated fatty acids remain in contact with the catalyst i.e. up to actual removal of the catalyst. Usually therefore crude hydrogenated fatty acid products contain fatty acid metal soaps, depending on processing technique and catalyst employed, in an amount of about 200 milligram of free metal per kilogram of fatty acid.

Further purification of the hydrogenated fatty acid, for instance by distillation, can remove metal fatty acid soaps, but also produces a concentrate or residue rich in metal fatty acid soap (containing up to 10.000 mg metal/kg residue), which product is difficult to process further. One possibility is to burn the organic material and to recover the metal from the ashes.

Another albeit theoretical possibility is to remove or minimise the amount of fatty acid metal soap eventually present in the crude hydrogenated product by special measures.

It is an object of the present invention to provide a method for removing fatty acid metal soaps derived from metals with an atomic number from 27 to 29 from hydrogenated fatty products which method comprises separating solid metal precipitated under the influence of hydrogen at a pressure ranging between 0.05 (rather 0.1 or better 0.2) and 10 MPa from the hydrogenated fatty products. The solid metal may be caused to precipitate from the soap-containing product in a number of ways, for example by maintaining the specified hydrogen pressure for a time sufficient for the solid metal to precipitate. The precipitated solid metal is then separated either while hydrogen pressure is maintained or under such conditions that the precipitated solid metal will not revert to the soluble soap. In a preferred method solid metal is precipitated under the influence of hydrogen at a pressure ranging between 0.5 and 5 MPa, more preferably hydrogen at a pressure ranging between 1 and 3 MPa.

The process according to the present invention is useful for the removal of fatty acid soaps of a metal having an atomic number between 27 and 29, in particular for the removal of nickel (N=28).

After hydrogenation and subsequent precipitation of the metal under the influence of hydrogen under pressure the metal particles are separated from the fatty product, preferably by filtration, more preferably filtration under hydrogen pressure (0.05–5 MPa) which is conveniently achieved by means of a vertical pressure leaf filter e.g. a Niagara filter. The process according to the present invention , optionally including the preceding hydrogenation step can be carried out batchwise, continuously or semi-continuously e.g. by a cascade method.

In another embodiment of the invention the hydrogenated fatty product/fatty acid metal soap mixture is subjected to pretreatment with hydrogen under a pressure between 0.05 (rather 0.1, better still 0.2) and 10 MPa in an intermediate tank before separating the mixture. The hydrogenated fatty product/fatty acid metal soap mixture can be a crude hydrogenated fatty material or a residue or concentrate obtained by further purification of the fatty acids or fatty alcohols such as distillation. Such residues are viscous black products which comprise inter alia pitch, fatty acids, polymeric fatty acids, triglycerides, metal soaps etc. Fatty acids are here understood to be monomeric as well as dimeric fatty acids and fatty alcohols are understood to be monomeric as well as dimeric fatty alcohols. The dimer acid/alcohol normally contains 36 carbon atoms and two functional groups in the molecule.

The fatty substances which can be treated according to the present invention may be fully hydrogenated, partially hydrogenated or hydrobleached (insignificant drop in iodine value) products containing fatty acid metal soap.

Often it is advantageous to remove precipitated metal and hydrogenation catalyst (the metal often deposited on the catalyst) simultaneously from the hydrogenate material in one filtration step.

The process according to the present invention can result in technical scale operations yielding crude hydrogenated fatty acids with a typical metal content (due to metal soaps) of about 5 mg metal/kg fatty acid or a distillation residue with a typical metal content of 8–30 mg metal/kg product.

The hydrogenated fatty products preferably processed in accordance with the present invention are $C_{10}$ to $C_{22}$ fatty acids, $C_{20}$ to $C_{44}$ dimeric fatty acids, distillation residues obtained from hydrogenated fatty acids or alternatively they are $C_{10}$ to $C_{22}$ fatty alcohols.

Although hydrogenation of fatty material often takes place at temperatures from 170° to 235° C., the temperature of the hydrogenated fatty acids/metal soap mixture during separation of the metal from the hydrogenated fatty material is normally between 80° and 120° C. and for very viscous products temperatures up to 160° C. so that cooling step in an intermediate vessel is desirable.

EXAMPLE 1

A 500 ml Hofer autoclave equipped with an attached filter element suitable for filtration under high pressure was filled with 300 ml of technical oleic acid (iodine value 93.6; sulphur content 6.2 mg/kg; phosphorus content below 2 mg/kg and a water content of 0.02%), 0.045% of nickel was added in the form of a fatty nickel/silica catalyst containing 22% w.w. of nickel (Pricat 9932, ex Unichema Chemie GmbH, Emmerich, Germany). The autoclave was closed, rinsed and filled with nitrogen at 1 MPa, the contents were stirred at 800 r.p.m. and heated to 200° C. in 20 minutes. At 200° C. nitrogen was replaced by hydrogen at 3 MPa, which temperature and hydrogen pressure were maintained for 150 minutes under stirring. The autoclave and contents were then cooled to 100° C. in 60 minutes whilst the hydrogen pressure was released to the filtration pressure. The mixture of hydrogenated fatty acids and catalyst which contained some fatty acid nickel soap was subsequently filtered to remove catalyst and nickel in a number of experiments under different hydrogen pressures as indicated in the table below. The filtrate was analysed for its nickel content by inductive coupled plasma atomic emission spectroscopy and the results are also indicated in the table below.

| Hydrogen pressure (MPa) | Nickel content (mg/kg) |
|---|---|
| 0 (comparison at 0.1 MPa N = 2) | 200 |
| 0.2 | 45 |
| 0.6 | 20 |
| 1.0 | 15 |
| 1.5 | 11 |
| 2.0 | 5 |

EXAMPLE 2

In the same equipment and following the same procedure as described in Example 1 similar experiments were conducted, however, here the hydrogen pressure during hydrogenation and filtration were identical. The catalyst employed were somewhat different, both being of the nickel/silica type, but catalyst 9906 had slightly wider pores. Both were dosed at the same nickel level as in Example 1 (Pricat is a tradename for catalysts from Unichema Chemie GmbH, Emmerich, Germany). The results are tabulated below:

| Catalyst | Hydrogen pressure (MPa) | Ni-content (mg/kg) |
|---|---|---|
| Pricat 9933 | 0.5 | 13 |
| Pricat 9906 | 0.5 | 20 |
| Pricat 9933 | 2.0 | 7 |
| Pricat 9906 | 2.0 | 9 |

EXAMPLE 3

Using the equipment, fatty acid and the procedure described in Example 1 different nickel/silica catalysts were tested using filtration at a hydrogen pressure of 0.1 and 1.5 MPa respectively. The results are tabulated below.

| Catalyst | Nickel concentration (mg/kg) | |
|---|---|---|
| | at 0.1 MPa H = 2 | at 1.5 MPa H = 2 |
| Pricat 9912 | 30 | 7 |
| Pricat 9933 | 30 | 7 |
| Pricat 9932 | 45 | 6 |
| Pricat 9910 | — | 5 |
| Nysofact 101 (ex Engelhard Chemie BV, De Meern Netherlands) | 62 | 7 |

EXAMPLE 4

A 1 liter Medimex autoclave equipped with an attached filter element suitable for filtration under (high hydrogen) pressure was filled with 300 ml technical grade stearic fatty acids distillation residue (from hydrogenated, technical grade $C_{18}$ fatty acids) containing 4200 mg nickel/kg residue. To the residue 3 grams (1 wt%) of an amorphous silica-alumina was added as filter aid and nickel trapping agent. The autoclave was closed, flushed with hydrogen and the content was heated to 240° C. while stirring at 300 rpm. The hydrogen pressure at the final temperature of 240° C. was brought to 0.2 MPa and the temperature and pressure were maintained for 60 minutes. After this period the residue with the silica-alumina was subsequently filtered over the filter device whilst maintaining the temperature at 140° C. and the hydrogen pressure at 0.2 MPa. The filtrate was analysed on its nickel content by inductive coupled plasma atomatic emission spectroscopy. The nickel content in the filtrate was found to be 27 mg nickel/kg residue.

EXAMPLE 5

This example describes the removal of nickel from a stearic fatty acid distillation residue according as described in Example 4 but in contrast to Example 4 in this example nitrogen with a pressure of 0.2 MPa is applied during the filtration at 140° C. of the residue after treatment under 0.2 MPa of hydrogen in the autoclave. Higher viscosity and relatively low filtration temperature during filtration evidently prevented nickel soaps to be formed during filtration. Analysis of the filtered residue showed that the nickel content had decreased from 4200 down to 29 mg nickel/kg residue.

EXAMPLE 6

A 1 liter Medimex autoclave equipped with an attached filter element suitable for filtration under (high) hydrogen pressure was filled with 300 ml technical grade stearic fatty acids distillation residue containing 4200 mg nickel/kg residue. To the residue 3 grams (1 wt%) of an amorphous silica-alumina was added as filter aid and nickel trapping agent. The autoclave was closed, flushed with hydrogen and the content was heated to 240° C. while stirring at 300 rpm. The hydrogen pressure at the final temperature and pressure were maintained for 60 minutes. After this period the residue with the silica-alumina were subsequently filtered over the filter device whilst maintaining the temperature at 240° C. and the hydrogen pressure at 2.0 MPa. The filtrate was analysed on its nickel content by inductive coupled plasma atomatic emission spectroscopy. The nickel content in the filtrate was found to be 9 mg nickel/kg residue.

We claim:

1. Process for decreasing the amount of soluble fatty acid metal soap formed in the catalytic hydrogenation of a fatty acid wherein the soap results from a reaction of the fatty acid with hydrogenation catalyst containing a metal with an atomic number from 27 to 29, said process, comprising subjecting said hydrogenated fatty acid to hydrogen at a pressure ranging between 0.05 and 10 MPa to precipitate solid metal from said metal soap and filtering the solid metal thus precipitated.

2. Process according to claim 1 comprising separating solid metal precipitated under the influence of hydrogen at a pressure ranging between 0.2 and 5 MPa.

3. Process according to claim 1 comprising separating solid metal deposited under the influence of hydrogen at a pressure ranging between 1 and 3 MPa.

4. Process according to claim 1 in which the metal has an atomic number of 28 (is nickel).

5. Process according to claim 1 in which the separation is effected by filtration, preferably filtration under 0.05-5 MPa hydrogen pressure.

6. Process according to claim 5 in which the filtration is carried out in a filter comprising vertical pressure leaves.

7. Process according to claim 1 in which the hydrogenated fatty product/fatty acid metal soap mixture is subjected to treatment with hydrogen under a pressure between 0.05 and 10 MPa before separating the metal from the fatty product.

8. Process according to claim 1 in which precipitated metal and hydrogenation catalyst are removed simultaneously.

9. Process according to claim 1 in which the hydrogenated fatty product comprises $C_{10}$ to $C_{22}$ fatty acids, $C_{20}$ to $C_{44}$ dimeric fatty acids and/or $C_{10}$ to $C_{22}$ fatty alcohols.

10. Process according to claim 1 in which the temperature of the hydrogenated fatty products/metal soap mixture during separation is between 80° and 120° C.

* * * * *